No. 675,454. Patented June 4, 1901.
J. E. THORNTON.
PHOTOGRAPHIC CAMERA.
(Application filed Jan. 8, 1900.)
(No Model.)
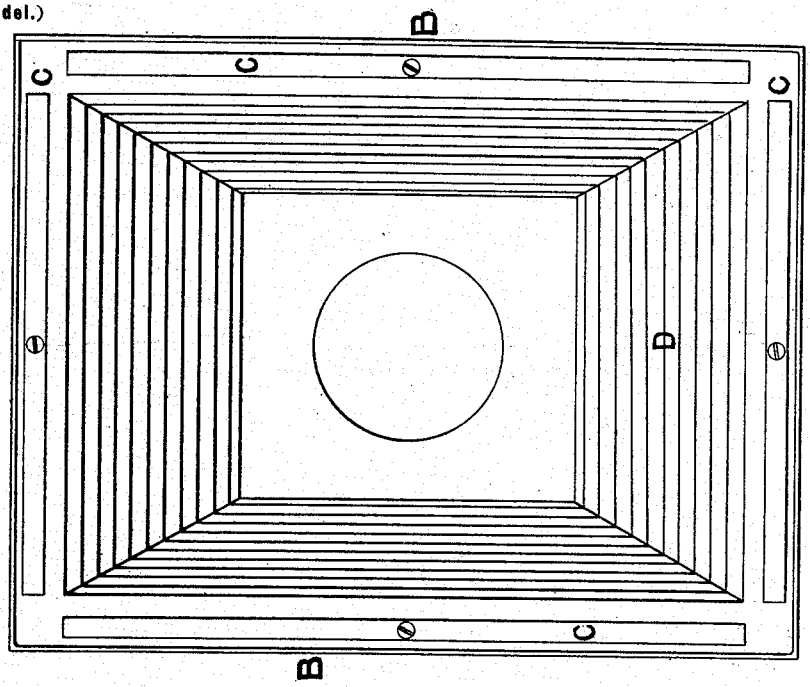
FIG. 2.
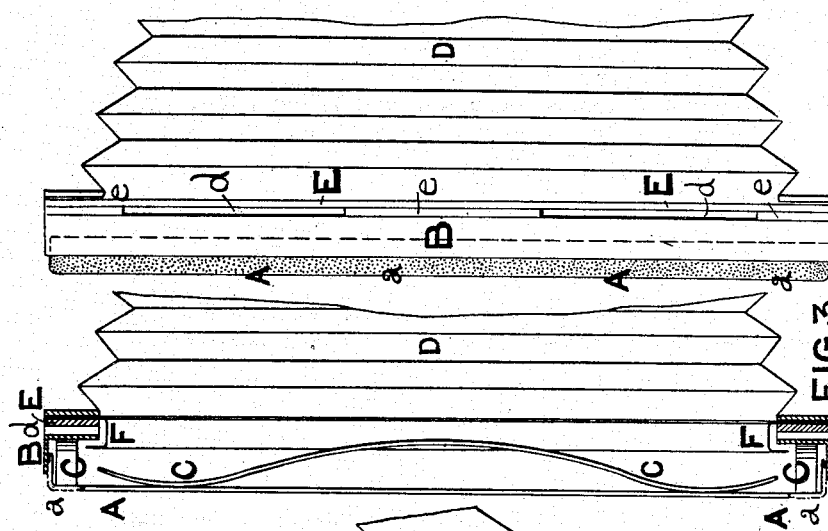
FIG. 1.
FIG. 3.
FIG. 5.
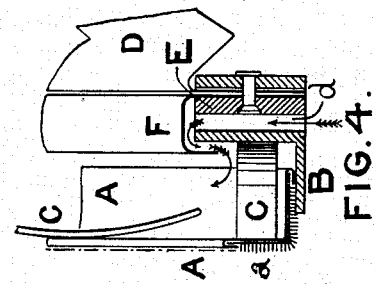
FIG. 4.
WITNESSES.
Joseph Bates
E. Howard.
INVENTOR.
J E Thornton
by Dowden O'Brien
atty.

UNITED STATES PATENT OFFICE.

JOHN E. THORNTON, OF MANCHESTER, ENGLAND.

PHOTOGRAPHIC CAMERA.

SPECIFICATION forming part of Letters Patent No. 675,454, dated June 4, 1901.

Application filed January 8, 1900. Serial No. 720. (No model.)

*To all whom it may concern:*

Be it known that I, JOHN EDWARD THORNTON, a subject of the Queen of Great Britain, residing at Manchester, in the county of Lancaster, England, (whose postal address is Worsley Mills, Hulme, Manchester, aforesaid,) have invented certain new and useful Improvements in Photographic Cameras, of which the following is a specification.

This invention relates to an appliance for obtaining and maintaining a light-tight joint between the camera and the sensitive plate, or the carrier for the same.

Hitherto a light-tight joint has been obtained in some cameras, (notably those of European design,) by a lining or packing of plush or velvet attached to the camera, against which the face of the carrier is tightly pressed or held in grooves. This, however, becomes defective after usage for some time, owing to the pile of the plush becoming flattened or pressed down, without any means to compensate for same. In other cameras, (notably those of American design,) the carrier is pressed into close contact with the face of the camera by springs pressing against the back of the carrier, the objection to this method being that accidental displacement of the springs in a backward direction allows light to get between the camera and carrier, and so fog the plate. This invention is designed to overcome these objections, and consists, essentially, in holding the carrier in its correct position in the camera by fixed stops behind the carrier, and excluding the light by means of a movable or yielding spring-frame that presses against the face of the camera.

It will be fully described with reference to the accompanying drawings, in which sufficient of a camera is shown to illustrate the invention.

Figure 1 is a side elevation. Fig. 2 is an elevation looking from back to front of the camera, with frame removed to show the position of the actuating-springs. Fig. 3 is a sectional elevation. Fig. 4 is an enlarged sectional detail. Fig. 5 is a sectional detail, showing a modified form of the spring-actuated frame.

A rectangular movable or sliding frame A is fitted inside a second frame or case B, attached to, or forming part of, the camera-body. The frame A is of any suitable material and cross-section; but I prefer to make it of sheet metal of angle form, though it may be of channel shape, as in Fig. 5. The frame or case B is also of angle shape. Behind the frame A are placed a number of springs C, which are attached to the frame B and tend to actuate or force the frame A outward, to keep it in close contact at every point with a plate or plate-carrier placed against it. The frame A is covered with a layer $a$ of soft pile fabric, such as plush.

As the junction of the frame A with the plate or plate-holder forms an approximately air-tight joint, it is desirable to form air-passages, to permit of the ingress and egress of air consequent upon the opening and closing of the bellows D, such passages being at the same time light-tight. These passages $d$ are formed between the frame or case B and a third frame E, which is separated at intervals from the frame B by pieces $e$, inserted between. The junction between the two frames B and E toward the inner side is covered by a metallic clip or strip F, giving a tortuous shape to the air-passage $d$, which opens into the interior of the two frames A and B, (the air passing inward in the direction of the arrows,) and renders it perfectly light-proof.

The bellows D are attached to the frame E.

What I claim as my invention, and desire to protect by Letters Patent, is—

1. In a photographic camera the combination, with a fixed frame or case, of a movable sliding frame and springs bearing against and actuating the same to form a light-tight joint between the camera and the front face of a plate or plate-carrier, substantially as described.

2. A light-excluding frame for cameras comprising in its construction, a fixed frame or case, a spring-actuated frame sliding backward and forward therein, and springs inserted between the two frames and pressing against the face of the carrier, substantially as described and shown.

3. In a photographic camera the combination with a fixed frame or case, of a spring-actuated frame sliding therein, springs inserted therein, a third frame attached to the case by pieces inserted at intervals between them to form air-passages, and a metallic strip placed to cover the junction of the two frames and give a tortuous shape to the air-passages, substantially as described.

In witness whereof I have hereunto signed my name in the presence of two subscribing witnesses.

J. E. THORNTON.

Witnesses:
J. OWDEN O'BRIEN,
JOSEPH BATES.